US012784146B2

(12) United States Patent
Pfaff et al.

(10) Patent No.: US 12,784,146 B2
(45) Date of Patent: Nov. 3, 2026

(54) TRAINING METHOD FOR A SYSTEM FOR DE-NOISING IMAGES

(71) Applicant: Siemens Healthineers AG, Forchheim (DE)

(72) Inventors: Laura Pfaff, Lohr (DE); Tobias Würfl, Erlangen (DE); Marcel Dominik Nickel, Herzogenaurach (DE); Fabian Wagner, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 295 days.

(21) Appl. No.: 18/583,944

(22) Filed: Feb. 22, 2024

(65) Prior Publication Data

US 2024/0296521 A1 Sep. 5, 2024

(30) Foreign Application Priority Data

Mar. 2, 2023 (EP) .................................... 23159761

(51) Int. Cl.
*G06T 5/60* (2024.01)
*G06T 5/70* (2024.01)

(52) U.S. Cl.
CPC .................. *G06T 5/60* (2024.01); *G06T 5/70* (2024.01); *G06T 2207/10088* (2013.01); *G06T 2207/20081* (2013.01); *G06T 2207/20084* (2013.01); *G06T 2207/30004* (2013.01)

(58) Field of Classification Search
None
See application file for complete search history.

(56) References Cited

U.S. PATENT DOCUMENTS 8,989,462 B2 * 3/2015 Fei .......................... A61B 5/055 382/128
11,410,323 B2 * 8/2022 Anisimovskiy ........... G06T 3/02
2016/0098820 A1 * 4/2016 Rousselle ............... G06T 15/06 345/426

(Continued)

FOREIGN PATENT DOCUMENTS

CN 114494057 A * 5/2022 ............. G06N 3/045

OTHER PUBLICATIONS

Xing, Qiwei, and Chunyi Chen. "Path tracing denoising based on SURE adaptive sampling and neural network." IEEE access 8 (2020): 116336-116349. (Year: 2020).*

(Continued)

*Primary Examiner* — Michelle M Entezari Hausmann
(74) *Attorney, Agent, or Firm* — Banner & Witcoff, Ltd.

(57) ABSTRACT

The disclosure describes a training method for training a system for de-noising images, which comprises an input-interface and a number of trainable bilateral filters designed and arranged for filtering an image provided by the input interface. The training method includes providing a plurality of training images as input for the system, providing a number of noise maps indicating the standard deviation of the noise for every pixel of a training image, training the number of bilateral filters being based on the training images and the number of noise maps, and calculating analytical gradients of a loss function with respect to filter parameters of the system. At least one of the loss functions is based on Stein's unbiased risk estimator.

19 Claims, 2 Drawing Sheets

(56) References Cited

U.S. PATENT DOCUMENTS

2023/0298162 A1* 9/2023 Arberet ................ G06V 10/454
382/131
2024/0144441 A1* 5/2024 Tohme ...................... G06T 5/60

OTHER PUBLICATIONS

Elad, Michael. "Retinex by two bilateral filters." International conference on scale-space theories in computer vision. Berlin, Heidelberg: Springer Berlin Heidelberg, 2005. (Year: 2005).*
Huang, Zhenxing, et al. "Deep cascade residual networks (DCRNs): Optimizing an encoder-decoder convolutional neural network for low-dose CT imaging." IEEE Transactions on Radiation and Plasma Medical Sciences 6.8 (2022): 829-840. (Year: 2022).*
Gadde, Akshay, Sunil K. Narang, and Antonio Ortega. "Bilateral filter: Graph spectral interpretation and extensions." 2013 IEEE International Conference on Image Processing. IEEE, 2013. (Year: 2013).*
CN114494057A [Machine Translation] (Year: 2022).*
Lin H, Zeng W, Ding X, Fu X, Huang Y, Paisley J. Noise2blur: Online noise extraction and denoising. arXiv preprint arXiv: 1912. 01158. Dec. 3, 2019. (Year: 2019).*
Pfaff L, Hossbach J, Preuhs E, Wagner F, Arroyo Camejo S, Kannengiesser S, Nickel D, Wuerfl T, Maier A. Self-supervised MRI denoising: leveraging Stein's unbiased risk estimator and spatially resolved noise maps. Scientific Reports. Dec. 19, 2023;13(1): 22629. (Year: 2023).*
Kishan, Harini, and Chandra Sekhar Seelamantula. "Optimal parameter selection for bilateral filters using Poisson Unbiased Risk Estimate." 2012 19th IEEE International Conference on Image Processing. IEEE, 2012. (Year: 2012).*
Stein, Charles M., "Estimation of the Mean of A Multivariate Normal Distribution", The annals of Statistics (1981): 1135-1151.; 1981.
Pfaff L. et al., "Training A Tunable, Spatially Adaptive Denoiser Without Clean Targets", in Proceedings of the joint annual meeting ISMRM-ESMRMB, 2022.
Anand, C S et al., "Wavelet Domain Non-Linear Filtering for MRI Denoising", Magnetic Resonance Imaging; published: Jul. 1, 2010; pp. 842-861; XP027093174; ISSN: 0730-725X.
Krull A. et al., "Noise2Void-Learning Denoising From Single Noisy Images", in Proceedings of the IEEE/CVF Conference on Computer Vision and Pattern Recognition, 2019, pp. 2129-2137.
Wagner F. et al., "Ultra Low-Parameter Denoising: Trainable Bilateral Filter Layers in Computed Tomography", Medical Physics, 2022.
Prah D.E. et al., "A Simple Method for Rectified Noise Floor Suppression: Phase-Corrected Real Data Reconstruction with Application To Diffusion-Weighted Imaging", Magn Reson Med., 64(2):418-29, 2010.
Simi, V R et al., "Prospect of Stein's Unbiased Risk Estimate as Objective Function for Parameter Optimization in Image Denoising Algorithmus—A Case Study on Gaussian Smoothing Kernel", 2019 international conference on data science and engineering; published: Sep. 26, 2019; pp. 149-153; XP033700128; DOI: 10.1109/ICDSE47409.2019.8971487.
Ronneberger, O. et al., "U-net: Convolutional Networks for Biomedical Image Segmentation", Computer Science Department and BIOSS Centre for Biological Signaling Studies, University of Freiburg, pp. 234-241, 2015.
Metzler C. et al.: "Unsupervised Learning with Stein's Unbiased Risk Estimator", arXiv preprint arXiv:1805.10531, 2018.
Nickel M. et al., "Machine-Learning-Based Denoising Of Complex Magnetic-Resonance-Imaging Data Using a Guidance Map", 2 pgs., 2021.

* cited by examiner

TRAINING METHOD FOR A SYSTEM FOR DE-NOISING IMAGES

CROSS-REFERENCE TO RELATED APPLICATIONS

The present application claims priority to and the benefit of is European Patent Application no. EP 23159761.8, filed Mar. 2, 2023, the contents of which are incorporated herein by reference in its entirety.

TECHNICAL FIELD

The disclosure pertains to a training method and a system for de-noising images, a filtering-method for de-noising an image, and a magnetic resonance imaging system.

BACKGROUND

Noise is a problem throughout the field of image acquisition. Especially for MR images acquired with low-field scanners, low signal-to-noise ratio (SNR) is a common issue that can result in degraded image quality and reduced clinical value.

Conventional noise-reduction methods are typically based on non-linear filters. Particularly the use of bilateral filters is well established due to their edge-preserving properties. The critical factor influencing the bilateral filter performance is the choice of filter hyper-parameters. Therefore, the determination of optimal values is still an ongoing research topic.

In recent years, deep learning-based approaches have achieved state-of-the-art de-noising results by learning representations from large amounts of data. However, most deep models consist of several convolutional layers with thousands of trainable parameters, which makes the training process computationally expensive. Moreover, they commonly require an extensive training set of paired data, i.e., noisy and noise-free images in the case of a de-noising task. For convolutional neural networks (CNNs), small perturbations in the input can lead to undesired network behavior and thus drastic changes in the predictions. Therefore, training a robust and flexible deep neural network that can handle a variety of MR images can only be realized by employing a representative data set covering, e.g., diverse image contrasts and pulse sequences. Otherwise, the network might produce faulty predictions when tested on data that is insufficiently represented in the training set, which needs to be avoided in clinical practice.

Moreover, the acquisition of noise-free images for conventional supervised network training is usually difficult or even infeasible in the context of medical imaging.

SUMMARY

To mitigate the problem of faulty network predictions when faced with unseen image features, in practice usually either several networks are trained for e.g. different image contrasts, or an extensive and representative data set needs to be collected.

Wagner et al. (see "Ultra low-parameter denoising: Trainable bilateral filter layers in computed tomography," Medical Physics, 2022) proposed to combine the advantages of both bilateral filters and neural networks by introducing a robust and parameter-efficient de-noising network consisting of trainable bilateral filter layers for low-dose CT images.

In cases where no paired ground-truth images are available for training, unsupervised learning methods like Noise2Void can be applied (see e.g. A. Krull et al. "Noise2Void-learning denoising from single noisy images," in Proceedings of the IEEE/CVF Conference on Computer Vision and Pattern Recognition, 2019, pp. 2129-2137). However, since unsupervised approaches typically cannot compete with state-of-the-art supervised methods, some strategies consider the integration of additional prior information.

It is possible to achieve state-of-the-art supervised performance without noise-free data by using a model-based supervision strategy that incorporates an adapted version of Stein's unbiased risk estimator (SURE; see C. Stein "Estimation of the mean of a multivariate normal distribution. The Annals of Statistics, pages 1135-1151, 1981) and a physics-driven noise model to train a U-Net architecture (see e.g. O. Ronneberger et al. "U-Net: Convolutional networks for biomedical image segmentation," in International Conference on Medical Image Computing and Computer-Assisted Intervention, 2015, pp. 234-241) for the de-noising of complex-valued reconstructed MR images (L. Pfaff, J. Hossbach, E. Preuhs, T. Wuerfl, S. Arroyo Camejo, M. D. Nickel, and A. Maier, "Training a tunable, spatially adaptive denoiser without clean targets," in Proceedings of the joint annual meeting ISMRM-ESMRMB, 2022).

SURE provides a statistical method to estimate the mean squared error (MSE) between the unknown mean x of a Gaussian distributed signal y and its estimate x'=f(y). This can be adapted to an image de-noising problem as shown by Metzler et al. (see "Unsupervised learning with Stein's unbiased risk estimator," arXiv preprint arXiv: 1805.10531, 2018). Here, the goal is to reconstruct an unknown noise-free image x corrupted by Gaussian noise $\eta$ from a noisy image $y=x+\eta$. Since the noise is additive and has zero mean, the unknown noise-free image x can be considered as the mean vector of the noisy image y.

The original SURE expression assumed the presence of spatially invariant Gaussian noise. In order to properly address the spatially variant noise enhancement in reconstructed MR images, the SURE approach has been extended accordingly by incorporating a noise map $\sigma$ that indicates the standard deviation of the noise for every pixel.

Consequently, SURE can be used as a loss function to train a neural network f(y) that receives noisy measurements y as input and predicts an estimate of x as output by minimizing SURE (over the pixel d of the total number of pixels D and the noise maps $\sigma$), i.e., the estimated MSE is represented in Equation (1) below as follows:

$$\frac{1}{D}\|f(y)-x\|^2 = \frac{1}{D}\|f(y)-y\|^2 - \frac{1}{D}\sum_{d=1}^{D}\sigma_d^2 + \frac{2}{D}\sum_{d=1}^{D}\sigma_d^2\frac{\partial f_d(y)}{\partial y_d}. \quad (1)$$

The coefficients $\sigma_d$ represent elements of the noise maps $\sigma$, i.e. the noise level, i.e. the standard deviation of the noise, of single pixels d. Simple values could be used that represent noise.

One problem is the complexity of CNNs and the use of complex feature maps from the input image. Especially unsupervised training is difficult and a vast amount of training data is necessary.

Thus, it is an object of the present disclosure to improve upon the known devices and methods to provide a system for de-noising images and to facilitate an optimized de-noising of images.

This object is achieved by the embodiments as described herein, which are directed to a training method, a system, a filtering-method, and a magnetic resonance imaging system (MRI-system), which are also described in the claims.

A training method according to the disclosure for a system for de-noising images is configured for training a system comprising an input-interface and a number of trainable bilateral filters configured and arranged for filtering an image provided by the input interface.

Trainable bilateral filters are generally known. In an embodiment, the system comprises one or more of these filters that may be arranged in a serial manner so that the output of a first filter is the input of the second filter, and so on (i.e. the output of a preceding filter is the input of the following filter). The input interface provides an input image to the filters of the system.

In an embodiment, the training method comprises:

providing a plurality of training images as input for the system, providing a number of noise maps indicating the standard deviation of the noise for every pixel of an input image, training the number of bilateral filters based on the training images and the number of noise maps and based on calculating analytical gradients of a loss function with respect to filter parameters of the system, wherein at least one of the loss functions is based on Stein's unbiased risk estimator.

Applicable training procedures to train the one or more bilateral filters of the system are generally known. Usually, the training is based on optimizing the filter parameters by the use of the input image. It should be noted that by using a loss functions based on Stein's unbiased risk estimator (SURE), unsupervised training (without a ground truth) is possible. Although, the general principles of training and SURE are known, the use of trainable bilateral filters as well as their training based on SURE is a novel system in accordance with the embodiments described herein.

The (training) images may e.g. comprise MRI images. However, the system is not limited in this regard, and may alternatively be trained to de-noise other types of images, e.g. CT images or photos. It should be noted that the training images are normal images. The expression "training" is used herein to indicate that these images are used for training.

For the training method, a large number of (training) images are provided (tens, hundreds, thousands, or more). Since the training method preferably deals with unsupervised learning, the images may simply be recorded without the need of any ground truth. And since effective training needs a large amount of data, it is preferable to use a large number of images. The images may show the same object from the same angle of view (then images of this object recorded from this point of view can be de-noised very well), or this object recorded from different points of view (then images of this object can be de-noised very well independent from the angle of recording). However, the images may also show different objects for effectively de-noising arbitrary images.

A special aspect of SURE is that information about the local noise distribution is used in the form of a noise map. SURE then allows the noisy image (input image) and noise map to be used instead of a noise-free ground truth. Shortly outlining the very principle, the training is coordinated in such a way that the (assumed) noise-free image x matches the noisy image y (input image) within the framework of the noise map σ. Thus, a noise-free ground truth is not needed. The noisy image y (input image) is fed into the system, which has the various trainable parameters (filter parameters). With the help of the network output and the noise map σ, the SURE loss (i.e. the cost function) may be calculated according to above Equation (1):

$$\frac{1}{D}\|f(y)-x\|^2 = \frac{1}{D}\|f(y)-y\|^2 - \frac{1}{D}\sum_{d=1}^{D}\sigma_d^2 + \frac{2}{D}\sum_{d=1}^{D}\sigma_d^2\frac{\partial f_d(y)}{\partial y_d}.$$

The factor D has no influence in praxis, such that this formula may also be simplified to read as follows:

$$\|f(y)-x\|^2 = \|f(y)-y\|^2 - \sum_{d=1}^{D}\sigma_d^2 + 2\sum_{d=1}^{D}\sigma_d^2\frac{\partial f_d(y)}{\partial y_d}.$$

In the course of the training, gradients are determined for the various parameters according to the SURE loss and these are successively adjusted. This procedure, i.e. an input image being fed into the system, SURE loss is calculated with the output of the system and the noise map, and then network parameters being updated, is repeated until the loss converges, i.e. the loss is minimized.

The basic idea of SURE is that one can estimate the MSE (mean squared error) without knowing the noise-free image x of Equation (1). Instead, only the noise map σ is needed. A noise map could be present as an individual map or the noise map may be integrated (e.g. as a special formula) in a SURE algorithm or in a loss function. In short: the output f(y) of the filters should be noise free. Thus, it should optimally be like x. Therefore, the SURE-loss should be very near to 0 and the right side of (1) should also be near 0.

At the beginning the network parameters are initialized (often randomly), which means there is usually an output that is not good at the beginning and the loss is therefore the highest at the beginning. With the correct setting of the parameters during the training process, the output gets better and better and the loss is lower.

Applicable noise maps may be calculated. For e.g. MRI images, a noise map can be calculated by propagating the noise distribution in k-space measured with a noise adjustment scan through the entire image reconstruction pipeline. For other images, a noise map could be acquired by test measurements or derived from calibration images. It is also preferred that a noise map is calculated from the input images, e.g. by calculating a standard deviation of the noise in the images, e.g. the noise level for every pixel.

Combining both trainable bilateral filters together with the SURE-based training strategy for image de-noising, a system (e.g. a neural network) that is built from trainable bilateral filter layers can be trained without any ground-truth data for noise-reduction.

The system may comprise only one bilateral filter; however, two or more bilateral filters are advantageous, e.g. two, three or four. As already said above, a serial arrangement of filters may be particularly useful. However, a parallel arrangement of filters or a parallel arrangement of serially arranged filters may also be advantageous, especially in the case there are two or more sub-images, e.g. one real image contribution and one imaginary image contribution of a complex image.

A bilateral filter assigns a new value to each pixel by calculating a weighted average of values from neighboring pixels $y_n$, with n representing an integer>0 based on both spatial and intensity distances, such that Equation (2) is realized as follows:

$$x_i = \frac{1}{w_i}\sum_{n}^{N} f_s(p_i - p_n) f_r(y_i - y_n) y_n \tag{2}$$

with pixel position p and normalization factor $w_i$ defined as Equation (3) as follows:

$$w_i = \sum_{n}^{N} f_s(p_i - p_n) f_r(y_i - y_n). \tag{3}$$

Spatial filter kernel $f_s$ and intensity range kernel $f_r$ can be expressed as Gaussian functions. In the two-dimensional case, they are defined as Equations (4) and (5) as follows:

$$f_s(d) = \exp\left(\frac{-a_x}{2\kappa_x^2} - \frac{a_y}{2\kappa_y^2}\right) \text{ and} \tag{4}$$

$$f_r(d) = \exp\left(\frac{-a}{2\kappa_r^2}\right) \tag{5}$$

with $a_x=P_{ix}-P_{nx}$, $a_y=P_{ny}-P_{ny}$ (the distance in two dimensions) and $a=y_i-y_n$.

Hence, the bilateral filter contains especially three tunable parameters that are usually hand-picked by the user. In their work, Wagner et al. (see "Ultra low-parameter denoising: Trainable bilateral filter layers in computed tomography," Medical Physics, 2022) introduced a differentiable, trainable bilateral filter layer that directly optimizes its filter parameters by calculating analytical gradients of a loss function with respect to each parameter. The loss can then be propagated into previous layers via back-propagation.

In this way, a neural network architecture can be designed by stacking multiple bilateral filter layers similar to, e.g. convolutional layers. With the combination of multiple consecutive bilateral filters and the gradient-based optimization of filter parameters, trainable bilateral filter layers are generally more flexible and powerful than conventional bilateral filters. The filters may e.g. be trained together (in a combined manner), so that the noise map is applied for the output of the last filter (i.e. the output of the system).

A system according to the disclosure for de-noising an image comprises an input-interface, a number of trainable bilateral filters designed and arranged for filtering an image provided by the input interface, wherein the number of trainable bilateral filters is trained with a training method according to the disclosure, as described above and in the following. The system may e.g. comprise a plurality of bilateral filters connected in a serial connection, wherein at least an output of a first bilateral filter is used as input for a second bilateral filter. The system may e.g. comprise a neural network built from the plurality of trainable bilateral filter layers.

A filtering-method according to the disclosure for de-noising an image with a system according to the disclosure, comprises:

providing an image, filtering the image with the number of bilateral filters of the system, and outputting a filtered image.

A magnetic resonance imaging system (MRI-system) according to the disclosure comprises system according to the disclosure and may also be configured to train this system according to a training method according to the disclosure.

Some units or modules of the system mentioned herein may be completely or partially realized as software modules running on a processor of a respective computing system, e.g. of a control device of a magnetic resonance imaging system. A realization largely in the form of software modules can have the advantage that applications already installed on an existing computing system can be updated, with relatively little effort, to install and run these units of the present application. The object of the disclosure is also achieved by a computer program product with a computer program that is directly loadable into the memory of a computing system, and which comprises program units to perform the steps of the method embodiments as described herein, at least those steps that could be executed by a computer when the program is executed by the computing system. In addition to the computer program, such a computer program product can also comprise further parts such as documentation and/or additional components, also hardware components such as a hard-ware key (dongle etc.) to facilitate access to the software.

A non-transitory computer readable medium such as a memory stick, a hard-disk, or other suitable transportable or permanently-installed carrier may serve to transport and/or to store the executable parts of a computer program product so that these can be read from a processor unit of a computing system. A processor unit may e.g. comprise one or more microprocessors or their equivalents.

Particularly advantageous embodiments and features of the disclosure are further described herein, including the claims. Features of different claim categories may be combined as appropriate to provide further embodiments not described herein.

In an embodiment, according to a training method, the loss function comprises a norm of the difference between the input image y and the output image f(y), e.g. the Euclidean norm in the form of a mean squared error ||f(y)−y||2.

In an embodiment, a training method includes the loss function being based on a physics-driven noise model. For instance, the loss function may incorporate the noise model in the form of a sum of squared noise maps σ, e.g. together with a sum of the squared noise maps σ multiplied to the partial differentiation of the output of the system:

$$\sum_{d=1}^{D}\sigma_d^2 \text{ and/or } 2\sum_{d=1}^{D}\sigma_d^2\frac{\partial f_d(y)}{\partial y_d}.$$

The loss function may e.g. comprise a term in the form of:

$$\|f(y) - y\|^2 - \sum_{d=1}^{D}\sigma_d^2 + 2\sum_{d=1}^{D}\sigma_d^2\frac{\partial f_d(y)}{\partial y_d}.$$

In an embodiment, according to a training method, the training images are MRI images and the noise maps are calculated by propagating a noise distribution in k-space measured with a noise adjustment scan, e.g. through an entire image reconstruction pipeline.

In an embodiment, according to a training method, the system comprises a plurality of layers of bilateral filters connected in a serial connection, especially in the form of layers. In an embodiment, an architecture may comprise at least an output of a first bilateral filter of a first layer that is used as input for a second bilateral filter of a second layer, and at least the first bilateral filter and the second bilateral filter are both trained based on calculating analytical gradients of a loss function for each bilateral filter with respect to each parameter, wherein at least one of the loss functions is based on Stein's unbiased risk estimator.

In an embodiment, according to a preferred training method, a loss for a Stein's unbiased risk estimator is calculated on an output image, e.g. an output image of the last bilateral filter (or the last filter layer), based on the noise map.

In an embodiment, according to a training method, the loss of the loss function is propagated into previous number of bilateral filters (previous filter layers) via back-propagation. Here, the derivative of the loss is calculated with respect to each individual trainable model parameter. This is preferably done via the chain and product rules of differentiation. Popular deep learning frameworks like PyTorch automatically calculate these derivatives with respect to each trainable parameter as all their functions are differentiably implemented. It may be particularly advantageous to, after backpropagating the loss to each trainable model parameter, conducting a global update step that changes all trainable parameters according to the respectively back-propagated loss. All filter layers may e.g. be trained simultaneously. As an example, only the output of the last bilateral filter (or the last filter layer) may be used for the loss calculation.

In an embodiment, according to a training method, at least a part of the training images, e.g. every training image, is not connected to any ground-truth data.

In an embodiment, according to training method it is especially advantageous in the case where there are repetitions of images with low signal to noise ratio (SNR). Such a method comprises:

- providing numerous image-datasets as training images, wherein each image-dataset comprises a plurality of complex valued image-repetitions (images being repetitions of independent measurements of the same region of interest with the same acquisition parameters),
- performing a phase correction on the images, wherein for each provided image-repetition of an image-dataset a phase corrected signal image is calculated by amending the phase of the complex valued image-repetition such that the phases of the image-repetitions of the image-dataset are consistent and such that the signal image comprises signal contribution of the image-repetition,
- calculating a noise map for an image-dataset based on the standard deviation between the signal images of this image-dataset, and
- training the number of bilateral filters based on the signal images, the noise map and a loss function based on Stein's unbiased risk estimator.

Since effective training needs a large set of data, it is advantageous to use a large number of image datasets. The "nature" of datasets biases the accuracy of the system and the field of application. The image datasets may e.g. be acquired with the same acquisition parameters or with different acquisition parameters, such as e.g. different diffusion encodings and/or different b-values. However, the image datasets may also show different objects for effective de-noising of arbitrary images.

It should be noted that the disclosure deals with the problem of noisy image-repetitions. Thus, all image-datasets may comprise image-repetitions acquired with low SNR, which may be particularly advantageous.

As said above, the images are "complex valued". This means that each image of the image-repetitions comprises at least two independent image contributions. In MRI imaging, there is usually a real image and an imaginary image when reconstructing the acquired k-space. Thus, each image-repetition may be a complex image. However, "complex valued" also means that the images may also comprise other image contributions, as long as one of these contributions may be treated like the real image and another may be treated as imaginary image. For example, an image-repetition may also be vector-like with a first image component and a second image component.

This is important for the following phase correction. It should be noted that phases vary over the repetitions. Thus, regarding the image repetitions, it is not possible to get an averaged noise map, due to a non-consistent noise distribution. This is due to phase instabilities. The complex valued repetitions always have a Gaussian noise distribution and the phase correction removes phase instabilities while preserving the Gaussian noise distribution, which is needed for training with SURE. One special effect of the embodiments as described herein is that the contributions of the parts of the complex valued images are now shifted by the phase correction to solve this problem and produce an aligned Gaussian noise distribution.

With the phase correction on the images, each image-repetition of an image-dataset may be split up into a signal image comprising signal contribution and a noise image comprising only phase-related noise contribution (the noise image is not needed and could be ignored). This may advantageously be achieved by rotating the complex valued image in its image-space. In the case, the image is a complex image with a real image and an imaginary image, and this image could be rotated in complex space around the angle x with the function $e^{ix}$. Regarding a vector-like image with two image components, the phase correction could be achieved with a rotation in the vector space.

Although the correction does not necessarily have to be a pure rotation (it could also be or comprise a stretching or shortening), a pure rotation is advantageous, since it is very easy to calculate.

It is important that the phases of the image-repetitions are shifted such that the phases of the image repetitions of the dataset are consistent. Since all image repetitions may have different phases (concerning their signal and noise distribution), the case could occur that every image repetition needs an individual correction, e.g. an individual phase-rotation angle. As said above, it is advantageous that the correction shifts the signal contribution of all image repetitions such that they all have the same phase, e.g. such that the signal contribution lies in the real-part of a complex space. Thus, the signal contribution could easily be identified and this part of the image-repetitions could be taken as signal images.

It is also advantageous to perform a phase correction as described by D. E. Prah et al. (A simple method for rectified noise floor suppression: Phase-corrected real data reconstruction with application to diffusion-weighted imaging"; Magn Reson Med., 64(2):418-29, 2010) on the individual image-repetitions. With this correction method it is possible to compute averages over the complex valued images without signal loss while also preserving the zero-centered Gaussian noise distribution. This property also makes the images eligible for unsupervised deep learning-based de-noising using SURE.

Since multiple repetitions are acquired for each slice image, the required spatially resolved noise map incorporated in the SURE loss can simply be generated by calculating the standard deviation between the image-repetitions for each pixel.

Now there are phase corrected image-repetitions with a signal image (and possibly also a noise image). It should be noted that there is still a serious noise contribution in the signal images. The noise map for an image-dataset is calculated based on the standard deviation between the signal images of this image-dataset. This results in an accurate noise map directly depending on the noise of the images used for training.

BRIEF DESCRIPTION OF THE DRAWINGS

Other objects and features of the present disclosure will become apparent from the following detailed descriptions considered in conjunction with the accompanying drawings. It is to be understood, however, that the drawings are designed solely for the purposes of illustration and not as a definition of the limits of the disclosure.

In the diagrams, like numbers refer to like objects throughout. Objects in the diagrams are not necessarily drawn to scale.

DETAILED DESCRIPTION OF THE DISCLOSURE

Figure 1:
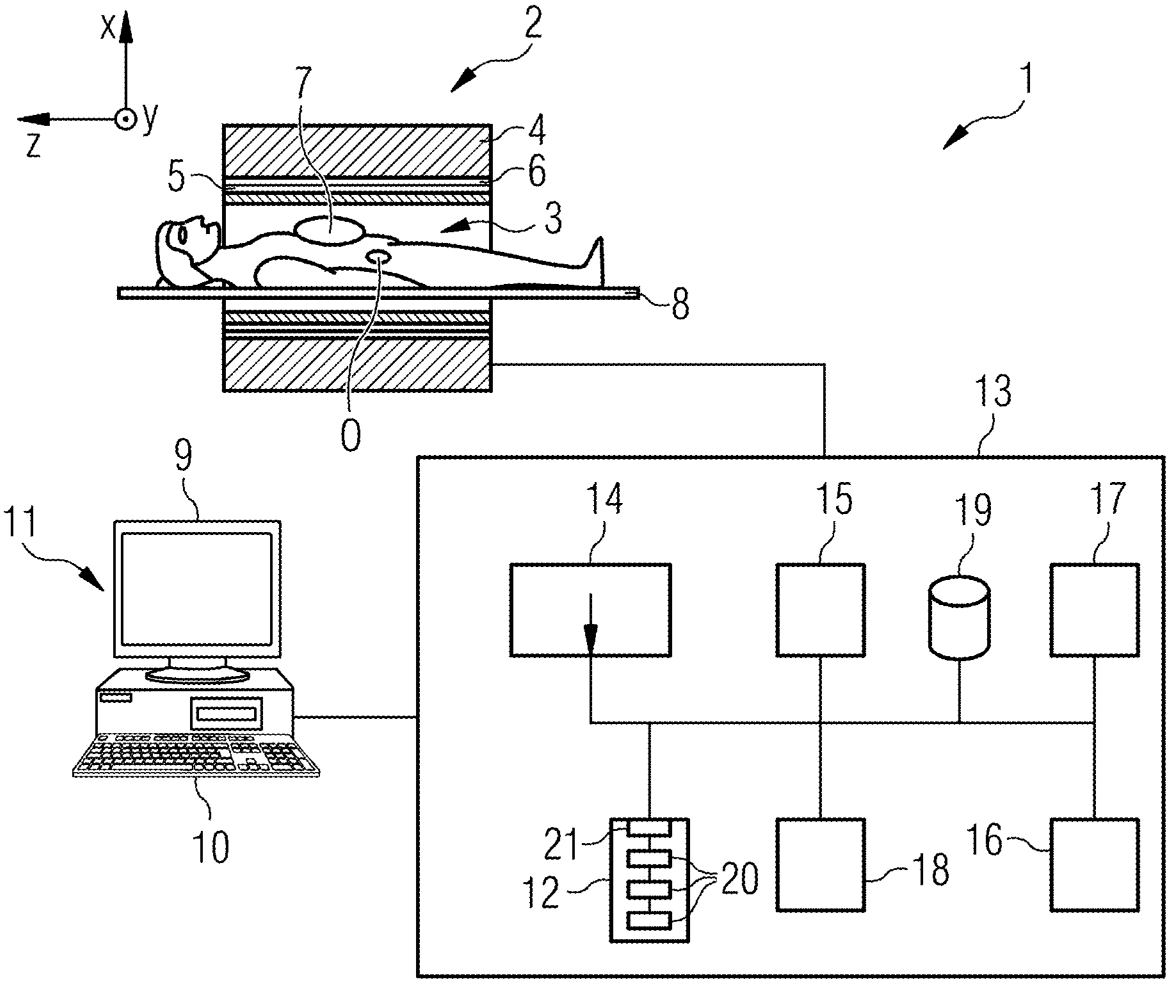
FIG. 1 illustrates an example MRI system according to an embodiment of the disclosure.

FIG. 1 illustrates a schematic representation of an example magnetic resonance imaging system 1 ("MRI-system"). The MRI system 1 includes the actual magnetic resonance scanner (data acquisition unit) 2 with an examination space 3 or patient tunnel in which a patient or test person is positioned on a driven bed 8, in whose body the actual examination object O is located.

The magnetic resonance scanner 2 is typically equipped with a basic field magnet system 4, a gradient system 6 as well as an RF transmission antenna system 5 and an RF reception antenna system 7. In the shown exemplary embodiment, the RF transmission antenna system 5 is a whole-body coil permanently installed in the magnetic resonance scanner 2, in contrast to which the RF reception antenna system 7 is formed as local coils (symbolized here by only a single local coil) to be arranged on the patient or test subject. In principle, however, the whole-body coil can also be used as an RF reception antenna system, and the local coils can respectively be switched into different operating modes.

The basic field magnet system 4 is designed to generate a basic magnetic field in the longitudinal direction of the patient, i.e. along the longitudinal axis of the magnetic resonance scanner 2 that proceeds in the z-direction. The gradient system 6 typically includes individually controllable gradient coils in order to be able to switch (activate) gradients in the x-direction, y-direction or z-direction independently of one another.

The MRI system 1 shown here is a whole-body system with a patient tunnel into which a patient can be completely introduced. However, in principle the disclosure can also be used at other MRI systems, for example with a laterally open, C-shaped housing, as well as in smaller magnetic resonance scanners in which only one body part can be positioned.

Furthermore, the MRI system 1 has a central control device 13 that is used to control the MRI system 1. This central control device 13 (or "control unit" 13) includes a sequence control unit 14 for measurement sequence control. With this sequence control unit 14, the series of radio-frequency pulses (RF pulses) and gradient pulses can be controlled depending on a selected pulse sequence to acquire magnetic resonance images within a measurement session. For example, such a series of pulse sequences can be predetermined within a measurement or control protocol. Different control protocols for different measurements or measurement sessions are typically stored in a memory 19 and can be selected by and operator (and possibly modified as necessary) and then be used to implement the measurement.

To output the individual RF pulses of a pulse sequence, the central control device 13 has a radio-frequency (RF) transmission device 15 that generates and amplifies the RF pulses and feeds them into the RF transmission antenna system 5 via a suitable interface (not shown in detail). To control the gradient coils of the gradient system 6, the control device 13 has a gradient system interface 16. The sequence control unit 14 communicates in a suitable manner with the radio-frequency transmission device 15 and the gradient system interface 16 to emit the pulse sequence.

Moreover, the control device 13 has a radio-frequency (RF) reception device 17 (likewise communicating with the sequence control unit 14 in a suitable manner) in order to acquire magnetic resonance signals (i.e. raw data) for the individual measurements, which magnetic resonance signals are received in a coordinated manner from the RF reception antenna system 7 within the scope of the pulse sequence.

A reconstruction unit 18 receives the acquired raw data and reconstructs magnetic resonance image data therefrom for the measurements. This reconstruction is typically performed according to the present disclosure. The image data can then be outputted or stored in a memory 19.

Operation of the central control device 13 can take place via a terminal 10 with an input unit and a display unit 9, via which the entire MRI system 1 can thus also be operated by an operator. MR images can also be displayed at the display unit 9, and measurements can be planned and started by means of the input unit (possibly in combination with the display unit 9), and in particular suitable control protocols can be selected (and possibly modified) with suitable series of pulse sequences.

The control unit 13 comprises a system 12 for de-noising an image comprising an input-interface 21, a number of trainable bilateral filters 20 designed and arranged for filtering an image provided by the input interface. In this example, three bilateral filters 20 are connected in a serial connection, wherein at least an output of a first bilateral filter 20 is used as input for a second bilateral filter 20 and so on. The bilateral filters (20) of the system 12 are preferably software modules.

The MRI system 1 according to the disclosure, and in particular the control device 13, can have a number of additional components that are not shown in detail but are typically present at such systems, for example a network interface to connect the entire system with a network and be able to exchange raw data and/or image data or, respectively, parameter maps, but also additional data (for example patient-relevant data or control protocols).

The manner by which suitable raw data are acquired by radiation of RF pulses and the generation of gradient fields, and MR images are reconstructed from the raw data, is known to those skilled in the art and thus need not be explained in detail herein.

Figure 2:
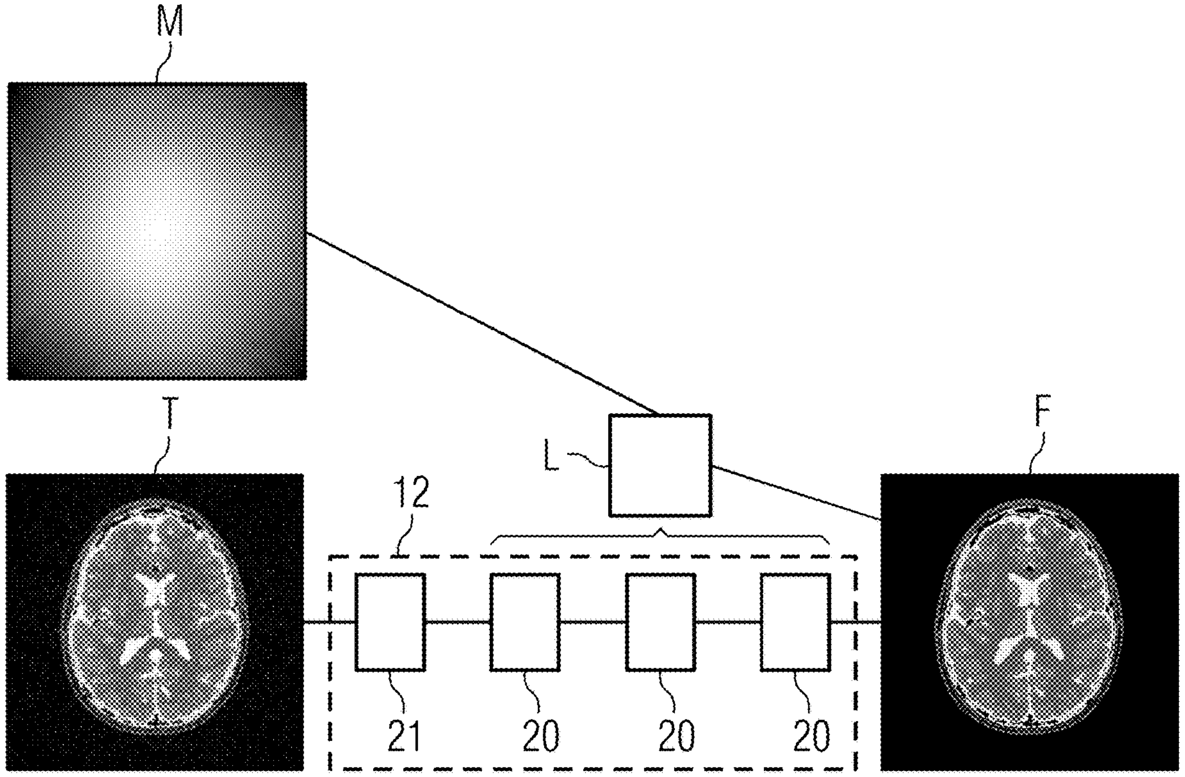
FIG. 2 illustrates an example process flow of a training method according to the disclosure.

FIG. 2 illustrates an example process flow of a training method according to the disclosure. The system 12 to be trained comprises an input interface 21 and three bilateral filters 20 arranged in a serial manner. The input interface 21 could simply be an input of the first bilateral filter 20, but could also be more complex e.g. an image reconstruction unit 18. The bilateral filters 20 of the system 12 represent the components to be trained.

In this system 12, a training image T is inputted (left) represents a vast number of training images T that should be inputted for training the system 12. For training, a noise map M is used. This noise map M may e.g. be one singe noise map, e.g. acquired in a measurement, however, the noise map may also be tailored to a training image T or a set of training images T, e.g. by calculating a standard deviation of several training images T.

By using a loss function L (e.g. a SURE loss L), calculated with the output image F and the noise map M, the bilateral filters 20 are trained with the training images T and the noise map M.

Figure 3:
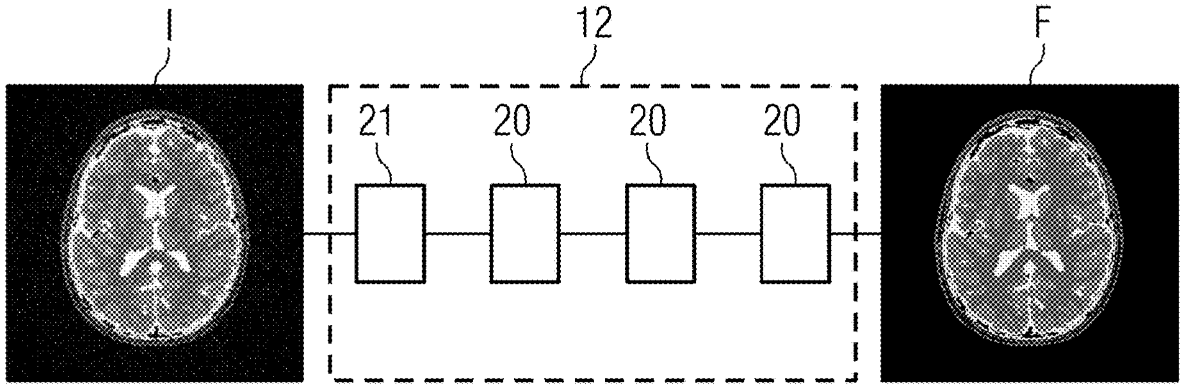
FIG. 3 illustrates an example process flow of a method for de-noising according to the disclosure.

FIG. 3 illustrates an example process flow of a method for de-noising an image I with a system 12 comprising an input interface 21 and three bilateral filters 20 arranged in a serial manner. This system 12 has been trained with a training method as shown in FIG. 2.

In this system 12, an image I is inputted at the input interface 21 and filtered by the three bilateral filters 20. On the right, the filtered image F is shown as the output of the system 12.

The image I may e.g. be produced from an image-dataset comprising a plurality of images. This plurality of images may then be averaged to form the image I, e.g. after a phase correction.

Although the present disclosure has been disclosed in the form of preferred embodiments and variations thereon, it will be understood that numerous additional modifications and variations could be made thereto without departing from the scope of the disclosure. For the sake of clarity, it is to be understood that the use of "a" or "an" throughout this application does not exclude a plurality, and "comprising" does not exclude other steps or elements. The mention of a "unit" or a "module" does not preclude the use of more than one unit or module. The expression "pair" could mean not only two, but also a "set of". The expression "a number" means "at least one". Independent of the grammatical term usage, individuals with male, female or other gender identities are included within the term.

The various components described herein may be referred to as "units" or "modules." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such units and modules, as applicable and relevant, may alternatively be referred to herein as "circuitry," "controllers," "processors," or "processing circuitry," or alternatively as noted herein.

What is claimed is:

1. A method for training a system for de-noising images, the system comprising an input-interface and a plurality of trainable bilateral filters configured to filter an image provided by the input interface, the method comprising:

providing a plurality of training images as an input to the system;

providing a plurality of noise maps indicating a standard deviation of noise for each pixel of one of the plurality of training images; and training the plurality of trainable bilateral filters based on the plurality of training images, the plurality of noise maps, and a calculation of analytical gradients of a loss function with respect to filter parameters of the system; and calculating the loss function for an output image of a final one of the plurality of trainable bilateral filters based on a respective one of the plurality of noise maps, wherein the loss function is based on Stein's unbiased risk estimator (SURE).

2. The training method according to claim 1, wherein the loss function comprises a norm of a difference between an input image y and an output image f(y).

3. The training method according to claim 1, wherein the loss function comprises a Euclidean norm in the form of a mean squared error $\|f(y)-y\|^2$.

4. The training method according to claim 1, wherein the loss function is based on a physics-driven noise model and incorporates noise maps in the form of:

$$\sum_{d=1}^{D}\sigma_d^2, \tag{i}$$

$$2\sum_{d=1}^{D}\sigma_d^2\frac{\partial f_d(y)}{\partial y_d}, \text{ and/or} \tag{ii}$$

$$\|f(y)-y\|^2-\sum_{d=1}^{D}\sigma_d^2+2\sum_{d=1}^{D}\sigma_d^2\frac{\partial f_d(y)}{\partial y_d}, \tag{iii}$$

wherein:

$\sigma_d$ represents the standard deviation of noise, d represents single pixels of the one of the plurality of training images, and D represents a total number of pixels of the one of the plurality of training images.

5. The training method according to claim 1, wherein the plurality of training images comprise MRI images calculated by a reconstruction algorithm from k-space data, and wherein the plurality of noise maps are calculated by propagating a noise distribution through the reconstruction algorithm based upon an initial noise associated with a noise adjustment scan.

6. The training method according to claim 1, wherein a loss of the loss function is propagated into a previous one of the plurality of trainable bilateral filters via backpropagation.

7. The training method according to claim 1, wherein each one of the plurality of training images is not connected to ground-truth data.

8. The training method according to claim 1, further comprising:

providing a further image;

filtering the further image with the plurality of trainable bilateral filters; and outputting a filtered further image.

9. The training method according to claim 8, further comprising:

providing an image dataset comprising a plurality of images; and averaging the plurality of images to generate the further image after performing a phase correction.

10. A magnetic resonance imaging system for de-noising an image, comprising:

a magnetic resonance scanner; and a controller, comprising:

an input-interface; and a plurality of trainable bilateral filters configured to filter an image provided by the input interface, the plurality of trainable bilateral filters form a neural network and are connected serially, with at least an output of a first one of the plurality of trainable bilateral filters of a first layer being used as an input for a second one of the plurality of trainable bilateral filters of a second layer, wherein the controller is configured to:

provide a plurality of training images as input to the system;

provide a plurality of noise maps indicating a standard deviation of noise for each pixel of one of the plurality of training images; and train the plurality of trainable bilateral filters based on the plurality of training images, the plurality of noise maps, and a calculation of analytical gradients of a loss function with respect to filter parameters of the system, and wherein the loss function is based on Stein's unbiased risk estimator (SURE).

11. The magnetic resonance imaging system according to claim 10, wherein the controller is configured to:

provide a further image;

filter the further image with the plurality of trainable bilateral filters; and output a further filtered image.

12. The magnetic resonance imaging system according to claim 11, wherein the controller is configured to:

provide an image dataset comprising a plurality of images; and average the plurality of images to generate the further image after performing a phase correction.

13. The magnetic resonance imaging system according to claim 10, wherein the plurality of training images comprise MRI images calculated by a reconstruction algorithm from k-space data, and wherein the plurality of noise maps are calculated by propagating a noise distribution through the reconstruction algorithm based upon an initial noise associated with a noise adjustment scan.

14. The magnetic resonance imaging system according to claim 10, wherein each one of the plurality of training images is not connected to ground-truth data.

15. A non-transitory storage medium associated with a system comprising an input-interface and a plurality of trainable bilateral filters configured to filter an image provided by the input interface, the non-transitory storage medium having instructions thereon that, when executed by a processor, cause the processor to train the system for de-noising images by:

providing a plurality of training images as an input to the system, the plurality of trainable bilateral filters being connected serially, with at least an output of a first one of the plurality of trainable bilateral filters of a first layer being used as an input for a second one of the plurality of trainable bilateral filters of a second layer;

providing a plurality of noise maps indicating a standard deviation of noise for each pixel of one of the plurality of training images; and training the plurality of trainable bilateral filters based on the plurality of training images, the plurality of noise maps, and a calculation of analytical gradients of a loss function with respect to filter parameters of the system, wherein at least the first bilateral filter and the second bilateral filter are trained based on calculating analytical gradients of the loss function for each the first bilateral filter and the second bilateral filter with respect to the filter parameters of the system, and wherein the loss function is based on Stein's unbiased risk estimator (SURE).

16. The non-transitory storage medium of claim 15, wherein the instructions, when executed by the processor, cause the processor to:

provide a further image;

filter the further image with the plurality of trainable bilateral filters; and output a further filtered image.

17. The non-transitory storage medium of claim 16, wherein the instructions, when executed by the processor, cause the processor to:

provide an image dataset comprising a plurality of images; and average the plurality of images to generate the further image after performing a phase correction.

18. The non-transitory storage medium of claim 15, wherein the plurality of training images comprise MRI images calculated by a reconstruction algorithm from k-space data, and wherein the plurality of noise maps are calculated by propagating a noise distribution through the reconstruction algorithm based upon an initial noise associated with a noise adjustment scan.

19. The non-transitory storage medium of claim 15, wherein each one of the plurality of training images is not connected to ground-truth data.

* * * * *